(12) United States Patent
Kagawa

(10) Patent No.: US 10,262,257 B2
(45) Date of Patent: Apr. 16, 2019

(54) RECORDING SYSTEM AND RECORDING METHOD

(71) Applicant: FUJIFILM CORPORATION, Minato-ku, Tokyo (JP)

(72) Inventor: Yusuke Kagawa, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 5 days.

(21) Appl. No.: 15/835,469

(22) Filed: Dec. 8, 2017

(65) Prior Publication Data

US 2018/0225561 A1 Aug. 9, 2018

(30) Foreign Application Priority Data

Feb. 6, 2017 (JP) ................. 2017-019359

(51) Int. Cl.
| | |
|---|---|
| *G06K 19/06* | (2006.01) |
| *G06K 19/07* | (2006.01) |
| *G06K 19/08* | (2006.01) |
| *G11B 23/04* | (2006.01) |
| *G11B 23/087* | (2006.01) |
| *G11B 15/07* | (2006.01) |

(52) U.S. Cl.
CPC ....... *G06K 19/08* (2013.01); *G06K 19/06028* (2013.01); *G06K 19/0723* (2013.01); *G11B 15/07* (2013.01); *G11B 23/042* (2013.01); *G11B 23/046* (2013.01); *G11B 23/0875* (2013.01); *G11B 23/08714* (2013.01)

(58) Field of Classification Search
CPC ......... G06F 19/00; G06F 17/00; G06Q 30/00; G06Q 90/00; G06K 19/00

USPC ......................................... 235/385, 375, 487
See application file for complete search history.

(56) References Cited

U.S. PATENT DOCUMENTS

| | | | | |
|---|---|---|---|---|
| 2007/0235516 | A1* | 10/2007 | Georgis ................. | G11B 17/22 235/375 |
| 2008/0065903 | A1* | 3/2008 | Goodman ........... | G06F 21/6218 713/193 |
| 2009/0273451 | A1* | 11/2009 | Soppera ............. | G06K 19/0723 340/10.4 |
| 2010/0254241 | A1* | 10/2010 | Aoki ...................... | G06F 3/0605 369/84 |
| 2011/0154052 | A1* | 6/2011 | Yang ....................... | G06F 21/80 713/189 |
| 2015/0113291 | A1* | 4/2015 | Suykerbuyk .......... | H04L 9/3247 713/193 |

FOREIGN PATENT DOCUMENTS

| | | |
|---|---|---|
| JP | 2006-318516 A | 11/2006 |
| JP | 2007-334958 A | 12/2007 |

* cited by examiner

*Primary Examiner* — Edwyn Labaze
(74) *Attorney, Agent, or Firm* — SOLARIS Intellectual Property Group, PLLC

(57) ABSTRACT

A recording system includes a reading part that reads information recorded on a first recording medium that is provided in a recording tape cartridge, of which recorded information is readable in a non-contact manner; and a recording part that records the information read by the reading part on a second recording medium of which recorded information is visually recognizable from the outside.

4 Claims, 3 Drawing Sheets

RECORDING SYSTEM AND RECORDING METHOD

CROSS-REFERENCE TO RELATED APPLICATION

This application claims priority under 35 USC 119 from Japanese Patent Application No. 2017-019359 filed Feb. 6, 2017, the disclosure of which is incorporated by reference herein.

BACKGROUND

Technical Field

The present disclosure relates to a recording system and a recording method.

Related Art

In the related art, a technique in which a barcode label on which identification information for identifying a recording tape cartridge is printed and a memory in which manufacturer information of the recording tape cartridge is recorded are provided in the recording tape cartridge has been proposed (see JP2007-334958A).

Further, a technique in which management information of an optical recording medium is recorded on a barcode label and a radio frequency identifier (RFID) tag provided on an optical recording medium has been proposed (see JP2006-318516A).

SUMMARY

However, generally, in a recording tape cartridge in which a first recording medium of which recorded information is readable in a non-contact manner is mounted and a second recording medium of which recorded information is visually recognizable from the outside are provided, in many cases, information shown in the following description is recorded on the second recording medium. That is, in this case, information relating to a recording tape cartridge, such as individual identification information for identifying an individual of the recording tape cartridge in an installation destination of the recording tape cartridge, is recorded on the second recording medium.

For example, in a case where an inquiry is made, with respect to a specific recording tape cartridge, to a manufacturer of the recording tape cartridge, since information recorded on the second recording medium is information given in an installation destination, the manufacturer cannot specify an individual of the recording tape cartridge using the information. Further, since information recorded on a first recording medium that is provided in the recording tape cartridge cannot be visually recognized from the outside, a user cannot visually recognize the information recorded on the first recording medium to transmit the information to the manufacturer.

It may be considered that the above-mentioned problem can be handled by recording the same information, specifically, information managed by the manufacturer of the recording tape cartridge on the first recording medium and the second recording medium. However, in the techniques disclosed in JP2007-334958A and JP2006-318516A, how to record the same information on the first recording medium and the second recording medium is not considered.

The present disclosure is made in consideration of the above-mentioned problems, and an object of the present disclosure is to provide a recording system and a recording method capable of reliably recording the same information on a first recording medium provided in a recording tape cartridge and a second recording medium of which recorded information is visually recognizable from the outside.

In order to achieve the object of the present disclosure, according to an aspect of the present disclosure, there is provided a recording system comprising: a reading part that reads information recorded on a first recording medium that is provided in a recording tape cartridge, of which recorded information is readable in a non-contact manner; and a recording part that records the information read by the reading part on a second recording medium of which recorded information is visually recognizable from the outside.

In the recording system according to this aspect of the present disclosure, the first recording medium may be an RFID tag, and the second recording medium may be a barcode label.

In the recording system according to this aspect of the present disclosure, the information recorded on the first recording medium may be individual identification information for identifying an individual of the recording tape cartridge.

According to another aspect of the present disclosure, there is provided a recording method comprising: reading information recorded on a first recording medium that is provided in a recording tape cartridge, of which recorded information is readable in a non-contact manner; and recording the read information on a second recording medium of which recorded information is visually recognizable from the outside.

According to the present disclosure, it is possible to reliably record the same information on a first recording medium provided in a recording tape cartridge and a second recording medium of which recorded information is visually recognizable from the outside.

BRIEF DESCRIPTION OF THE DRAWINGS

Exemplary Embodiments of the present invention will be described in detail with reference to the following figures, wherein.

DETAILED DESCRIPTION

Hereinafter, an exemplary embodiment for performing a technique of the present disclosure will be described in detail with reference to the accompanying drawings.

Figure 1:
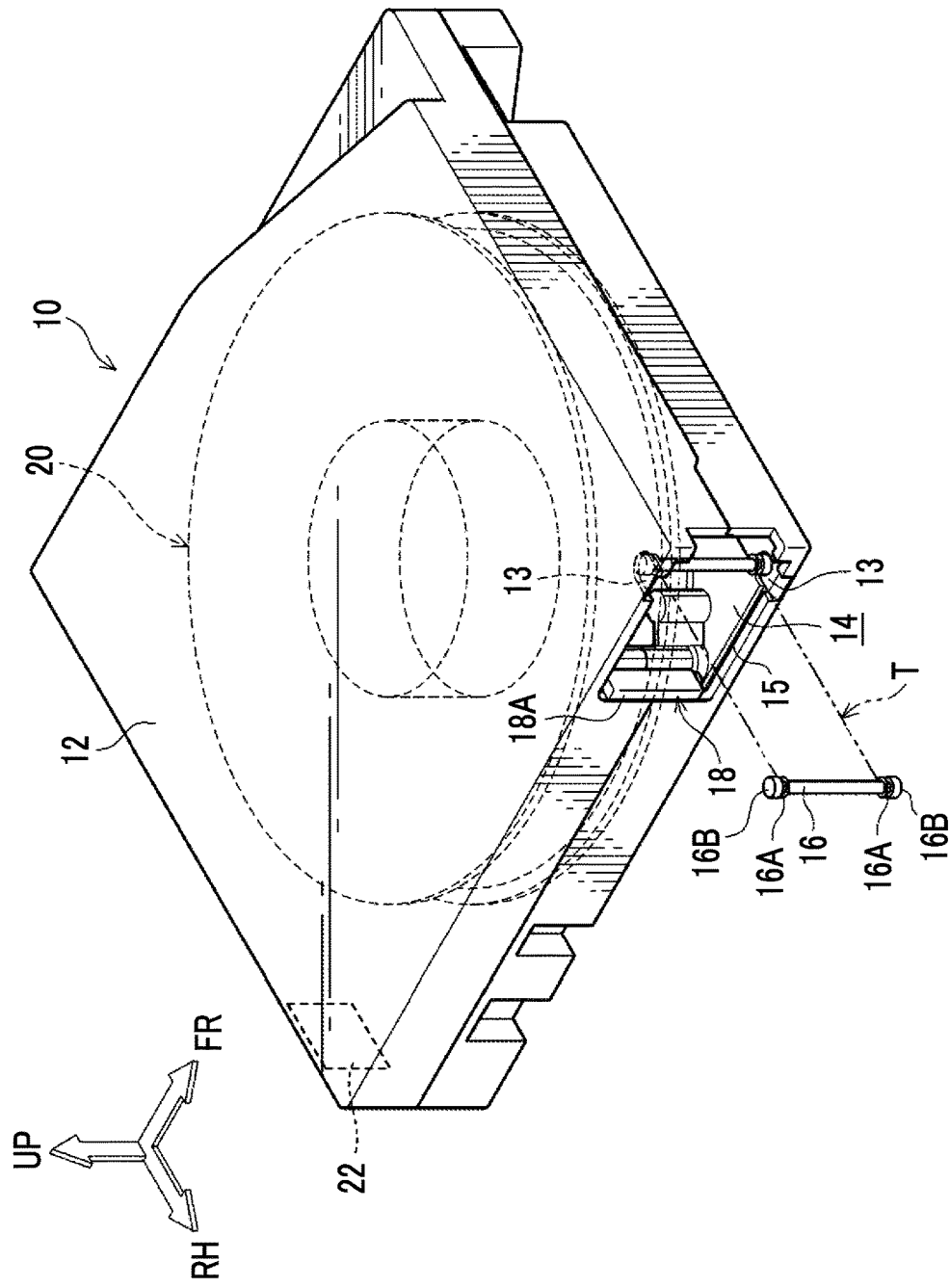
FIG. 1 is a perspective view showing an example of a recording tape cartridge according to an embodiment.

First, a configuration of a recording tape cartridge 10 according to this embodiment will be described with reference to FIG. 1. In FIG. 1, for ease of description, a direction in which the recording tape cartridge 10 is loaded to a drive device (not shown) is indicated by an arrow FR. Further, hereinafter, a direction indicated by the arrow FR is referred to as a forward direction (front side) of the recording tape cartridge 10. In addition, hereinafter, a direction indicated by an arrow RH that orthogonally intersects the arrow FR is referred to as a rightward direction (right side) of the recording tape cartridge 10, and a direction indicated by an arrow UP that orthogonally intersects the arrow FR and the arrow RH is referred to as an upward direction (upper side) of the recording tape cartridge 10.

As shown in FIG. 1, the recording tape cartridge 10 according to this embodiment includes a case 12 that is formed of a resin material such as polycarbonate (PC) in an approximately rectangular box shape. A resin reel 20 in which a recording tape T such as a magnetic tape that is an information recording reproduction medium is provided to be wound thereon is rotatably accommodated inside the case 12.

In a front part on a right wall of the case 12, an opening 14 for drawing out the recording tape T is formed. Further, on a free edge of the recording tape T drawn from the opening 14, a leader pin 16 that is a leader member that is operated to be drawn out while being locked by a drawer member (not shown) of the drive device is fixed. On opposite sides of the leader pin 16 in an axial direction thereof, annular grooves 16A are formed, and the annular grooves 16A are locked to hooks or the like of a drawer member.

Further, inside the opening 14 of the case 12, a pair of upper and lower pin holders 13 that positions and holds the leader pin 16 is formed in the case 12. The pin holder 13 is formed in an approximately semicircular shape that is opened on a side on which the recording tape T is drawn out, and opposite end portions 16B of the leader pin 16 in the axial direction in a state where the leader pin 16 is erected are able to enter the pin holders 13 through the opening side of the pin holder 13 or to exit therefrom.

The opening 14 of the case 12 is opened or closed by a door 18. The door 18 is formed in an approximately rectangular plate shape of such a size as to block the opening 14. Inside the opening 14, grooves 15 in which upper and lower end portions of the door 18 are slidably inserted are formed, and the door 18 is able to slidingly move along the right wall of the case 12.

Further, in a front end portion of the door 18, a convex portion 18A for opening and closing operations is provided to protrude rightward. In this configuration, as the convex portion 18A is engaged with an engaging member (not shown) of the drive device in accordance with loading of the recording tape cartridge 10 to the drive device, the door 18 is opened.

In addition, an RFID tag 22 that is an example of a first recording medium of which recorded information is readable in a non-contact manner through wireless communication or the like is provided in the case 12. In FIG. 1, an example in which the RFID tag 22 is disposed in a right rear portion in the case 12 is shown, but a position at which the RFID tag 22 is disposed in the case 12 is not particularly limited. The position at which the RFID tag 22 is disposed in the case 12 may be any position at which information recorded on the RFID tag 22 is readable by a reading part 34 (which will be described later) in a non-contact manner.

The RFID tag 22 according to this embodiment includes a non-volatile memory, and individual identification information for identifying an individual of the recording tape cartridge 10 in a manufacturer of the recording tape cartridge 10 is recorded on the RFID tag 22 in a manufacturing process of the recording tape cartridge 10.

Further, the RFID tag 22 according to this embodiment is an RFID tag of a type (so-called passive method) in which recorded individual identification information is transmitted to the reading part 34 according to radio waves transmitted by the reading part 34.

Figure 2:
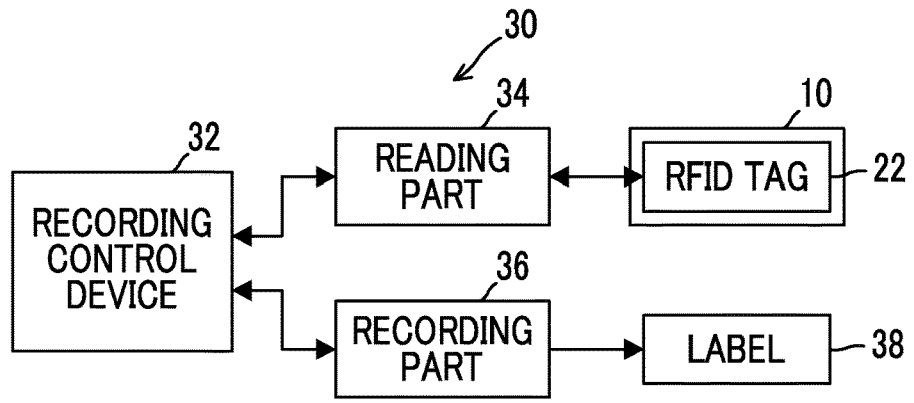
FIG. 2 is a block diagram showing an example of a configuration of a recording system according to an embodiment.

Next, a configuration of a recording system 30 according to this embodiment will be described with reference to FIG. 2. As shown in FIG. 2, the recording system 30 includes a recording control device 32, the reading part 34, and a recording part 36. The recording control device 32 and the reading part 34 are connected to each other in a communicable manner. Further, the recording control device 32 and the recording part 36 are connected to each other in a communicable manner. As an example of the recording control device 32, an information processing device such a personal computer or a server computer may be used.

The reading part 34 according to this embodiment reads individual identification information recorded on the RFID tag 22 provided in the recording tape cartridge 10 in a non-contact manner under the control of the recording control device 32, and outputs the read individual identification information to the recording control device 32. As an example of the reading part 34, an RFID reader may be used.

Figure 3:
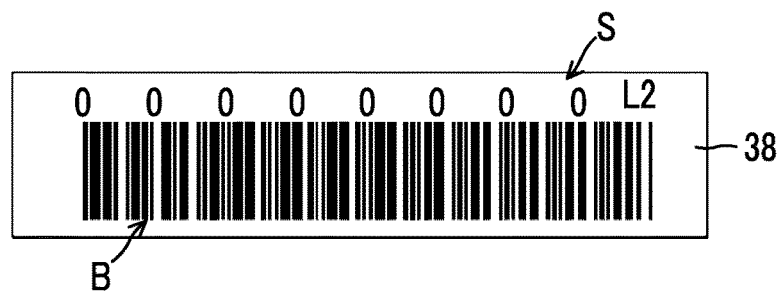
FIG. 3 is a diagram showing an example of a barcode recorded on a label according to an embodiment.

The recording part 36 according to this embodiment records individual identification information read by the reading part 34 under the control of the recording control device 32 on a label 38 that is an example of a second recording medium of which recorded information is visually recognizable from the outside. Specifically, the recording part 36 prints a barcode B indicating individual identification information and a digit string S indicating the individual identification information on the label 38 as shown in FIG. 3, for example. As an example of the recording part 36, a label printer may be used. In FIG. 3, a one-dimensional code is used as the barcode B, but the barcode B may be a two-dimensional code such as a QR code (registered trademark). The barcode B printed on the label 38 is read by a reading device capable of performing optical reading, such as a barcode reader.

Figure 4:
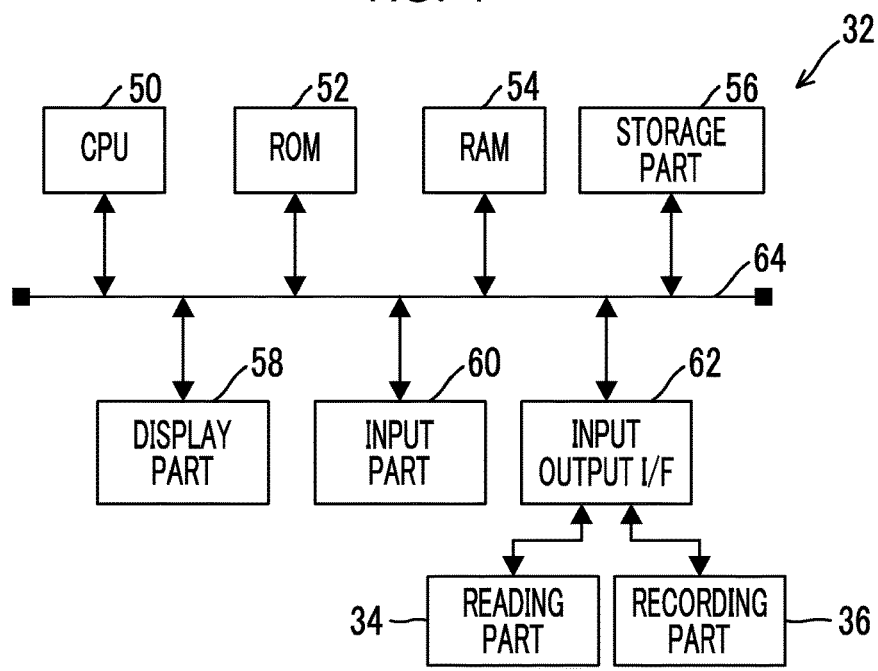
FIG. 4 is a block diagram showing an example of a configuration of main parts of an electric system of a recording control device according to an embodiment.

Then, the configuration of main parts of an electric system of the recording control device 32 according to this embodiment will be described with reference to FIG. 4. As shown in FIG. 4, the recording control device 32 includes a central processing unit (CPU) 50, and a read only memory (ROM) 52 in which various programs, various parameters, or the like are stored in advance. Further, the recording control device 32 includes a random access memory (RAM) 54 used as a work area or the like in a case where various programs are executed by the CPU 50, and a non-volatile storage part 56 such as a hard disk drive (HDD).

Further, the recording control device 32 includes a display part 58 such as a liquid crystal display, an input part 60 such as a keyboard or a mouse, and an input output interface (I/F) 62. Further, the respective parts of the CPU 50, the ROM 52, the RAM 54, the storage part 56, the display part 58, the input part 60, and the input output I/F 62 are connected to each other through a bus 64. In addition, the reading part 34 and the recording part 36 are connected to the input output I/F 62.

Figure 5:
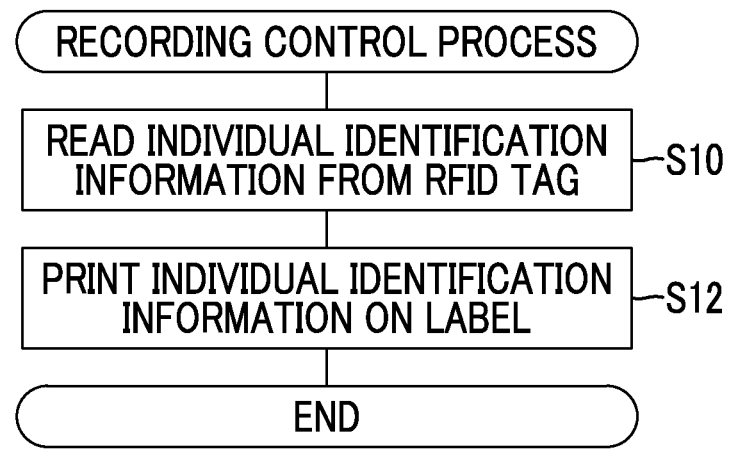
FIG. 5 is a flowchart showing an example of a flow of a recording control process according to an embodiment.

Next, an operation of the recording system 30 according to this embodiment will be described with reference to FIG. 5. As the CPU 50 of the recording control device 32 executes a recording control program, a recording control process shown in FIG. 5 is executed. The recording control program is installed in advance in the ROM 52 of the recording control device 32. Further, the recording control process shown in FIG. 5 is executed in a case where an execution instruction is input from a user through the input part 60, for example. Further, in this embodiment, it is assumed that the user disposes the recording tape cartridge 10 at a position at which information recorded on the RFID tag 22 can be read by the reading part 34, and then, inputs the execution instruction of the recording control process through the input part 60.

In step S10 of FIG. 5, the CPU 50 performs a control for causing the reading part 34 to read individual identification information recorded on the RFID tag 22, and acquires the individual identification information read by the reading part 34 through the input output I/F 62. Specifically, the CPU 50 performs a control for causing the reading part 34 to transmit radio waves. In a case where the RFID tag 22 receives the radio waves transmitted from the reading part 34 according to the control, the RFID tag 22 transmits the individual identification information recorded on the RFID tag 22 to the reading part 34. The reading part 34 receives the individual identification information transmitted from the RFID tag 22, and outputs the received individual identification information to the recording control device 32. Further, the CPU 50 acquires the individual identification information output from the reading part 34 through the input output I/F 62.

In the next step S12, the CPU 50 performs a control for causing the recording part 36 to print the barcode B and the digit string S on the label 38 using the individual identification information acquired in step S10. Specifically, the CPU 50 generates image data indicating an image including the barcode B and the digit string S shown in FIG. 3 using the individual identification information read in step S10. Further, the CPU 50 outputs the generated image data to the recording part 36 through the input output I/F 62. The recording part 36 prints the image indicated by the image data input from the CPU 50 through the input output I/F 62 on the label 38. In a case where the process of the step S12 is terminated, the recording control process is terminated. The label 38 on which the barcode B and the digit string S are printed in the process of step S12 is attached to a rear surface of the case 12.

The recording control process shown in FIG. 5 may be executed by a manufacturer of the recording tape cartridge 10, or may be executed by a delivery destination of the recording tape cartridge 10.

As described above, according to this embodiment, information recorded on a first recording medium that is provided in the recording tape cartridge, of which recorded information is readable in a non-contact manner, is read, and the read information is recorded on a second recording medium of which recorded information is visually recognizable from the outside. Accordingly, it is possible to reliably record the same information on the first recording medium that is provided in the recording tape cartridge and the second recording medium of which recorded information is visually recognizable from the outside.

Further, according to this embodiment, the individual identification information recorded on the first recording medium is recorded on the second recording medium. Generally, unique individual identification information is recorded on the first recording medium in a manufacturer of the recording tape cartridge. Accordingly, according to this embodiment, it is possible to record unique individual identification information on the second recording medium regardless of an installation destination of the recording tape cartridge.

In the embodiment, a case in which the RFID tag 22 is applied as the first recording medium of which recorded information is readable in a non-contact manner is described, but the present disclosure is not limited thereto. For example, a configuration in which a memory card provided with a wireless communication function is applied as the first recording medium may be used.

Further, in the embodiment, a case in which the label 38 is applied as the second recording medium of which recorded information is visually recognizable from the outside is described, but the present disclosure is not limited thereto. For example, a configuration in which a sheet such as plain paper is applied as the second recording medium may be used.

In addition, in the embodiment, a case in which individual identification information is recorded on the first recording medium is described, but the present disclosure is not limited thereto. For example, a configuration in which information relating to the recording tape cartridge 10 other than the individual identification information, such as a manufacturing date, a manufacturer name, or the like of the recording tape cartridge 10, is recorded on the first recording medium may be used.

Further, in the embodiment, a case in which an RFID tag of a passive method is applied as the RFID tag 22 is described, but the present disclosure is not limited thereto. For example, a configuration in which an RFID tag of a type of transmitting radio waves (so-called an active method) is applied as the RFID tag 22 may be used.

Further, in the embodiment, a case in which the recording part 36 prints individual identification information on the label 38 is described, but the present disclosure is not limited thereto. For example, a configuration in which the recording part 36 forms individual identification information at a predetermined position of the case 12 on a circumferential surface (for example, a rear surface) using laser, ink, and the like may be used.

Furthermore, in the embodiment, a configuration in which a recording control program is stored (installed) in the ROM 52 in advance is described, but the present disclosure is not limited thereto. The recording control program may be provided in a form in which the recording control program is recorded on a recording medium such as a compact disk read only memory (CD-ROM), a digital versatile disk read only memory (DVD-ROM), a universal serial bus (USB) memory. Further, the recording control program may be downloaded from an external device through a network.

What is claimed is:

1. A recording system comprising:
   a reading part that reads information recorded on a first recording medium that is provided in a recording tape cartridge, of which recorded information is readable in a non-contact manner; and
   a recording part that records the information read by the reading part on a second recording medium of which recorded information is visually recognizable from the outside; wherein
   the first recording medium is an RFID tag, and
   the second recording medium is a barcode label.

2. The recording system according to claim 1,
   wherein the information recorded on the first recording medium is individual identification information for identifying an individual of the recording tape cartridge.

3. A recording method comprising:

reading information recorded on a first recording medium that is provided in a recording tape cartridge, of which recorded information is readable in a non-contact manner; and recording the read information on a second recording medium of which recorded information is visually recognizable from the outside; wherein the first recording medium is an RFID tag, and the second recording medium is a barcode label.

4. A recording system comprising:

a reading part that reads information recorded on a first recording medium that is provided in a recording tape cartridge, the information is readable in a non-contact manner from the first recording medium; and a recording part that records the information read by the reading part on a second recording medium, the information recorded on the second recording medium is visually recognizable from the outside; wherein the first recording medium is an RFID tag, and the second recording medium is a barcode label.

* * * * *